(12) United States Patent
Kimura

(10) Patent No.: US 7,903,849 B2
(45) Date of Patent: Mar. 8, 2011

(54) MEDICAL IMAGE PROCESSING APPARATUS

(75) Inventor: Tokunori Kimura, Yaita (JP)

(73) Assignees: Kabushiki Kaisha Toshiba, Tokyo (JP); Toshiba Medical Systems Corporation, Tochigi (JP)

( * ) Notice: Subject to any disclaimer, the term of this patent is extended or adjusted under 35 U.S.C. 154(b) by 1054 days.

(21) Appl. No.: 11/404,014

(22) Filed: Apr. 14, 2006

(65) Prior Publication Data

US 2006/0233430 A1 Oct. 19, 2006

(30) Foreign Application Priority Data

Apr. 15, 2005 (JP) .................................. 2005-118770

(51) Int. Cl.
*G06K 9/00* (2006.01)
*A61B 6/00* (2006.01)

(52) U.S. Cl. ........................... 382/128; 382/219; 378/21

(58) Field of Classification Search .................. 382/100, 382/128, 129, 130, 131, 132, 133, 134, 168, 382/181, 189, 190, 194, 195, 203, 209, 219, 382/232, 260, 274, 276, 284–290, 305, 312, 382/294; 378/6, 21, 24
See application file for complete search history.

(56) References Cited

U.S. PATENT DOCUMENTS

| | | | | |
|---|---|---|---|---|
| 6,678,399 | B2 * | 1/2004 | Doi et al. ...................... | 382/131 |
| 7,286,694 | B2 * | 10/2007 | Oosawa ........................ | 382/128 |
| 7,426,319 | B2 * | 9/2008 | Takahashi ..................... | 382/294 |
| 2003/0099388 | A1 * | 5/2003 | Doi et al. ...................... | 382/131 |
| 2005/0152618 | A1 * | 7/2005 | Takahashi ..................... | 382/294 |

OTHER PUBLICATIONS

Friston et al., "Spatial Registration and Normalization of Images", Human Brian Mapping 2:165-189 (1995).
3DSRT, Nihon Gijutsu Gakkai Shi, , vol. 59, No. 12, pp. 1463-1474 (2003).

* cited by examiner

*Primary Examiner* — Seyed Azarian
(74) *Attorney, Agent, or Firm* — Nixon & Vanderhye P.C.

(57) ABSTRACT

A diagnosis target image is input, and a template ROI which is set on an image to divide the area on the image into predetermined areas in anatomical terms, physiological terms, or other scientific terms is read out from a storage unit. A matching processing unit warps the template ROI in correspondence with each diagnosis target image on the basis of the feature information of the diagnosis target image extracted by a feature information extraction unit. This warping is executed until an index indicating the degree of matching between the template ROI and the diagnosis image exceeds a predetermined threshold. The warped template ROI is displayed on a display unit upon being superimposed on the diagnosis image.

18 Claims, 6 Drawing Sheets

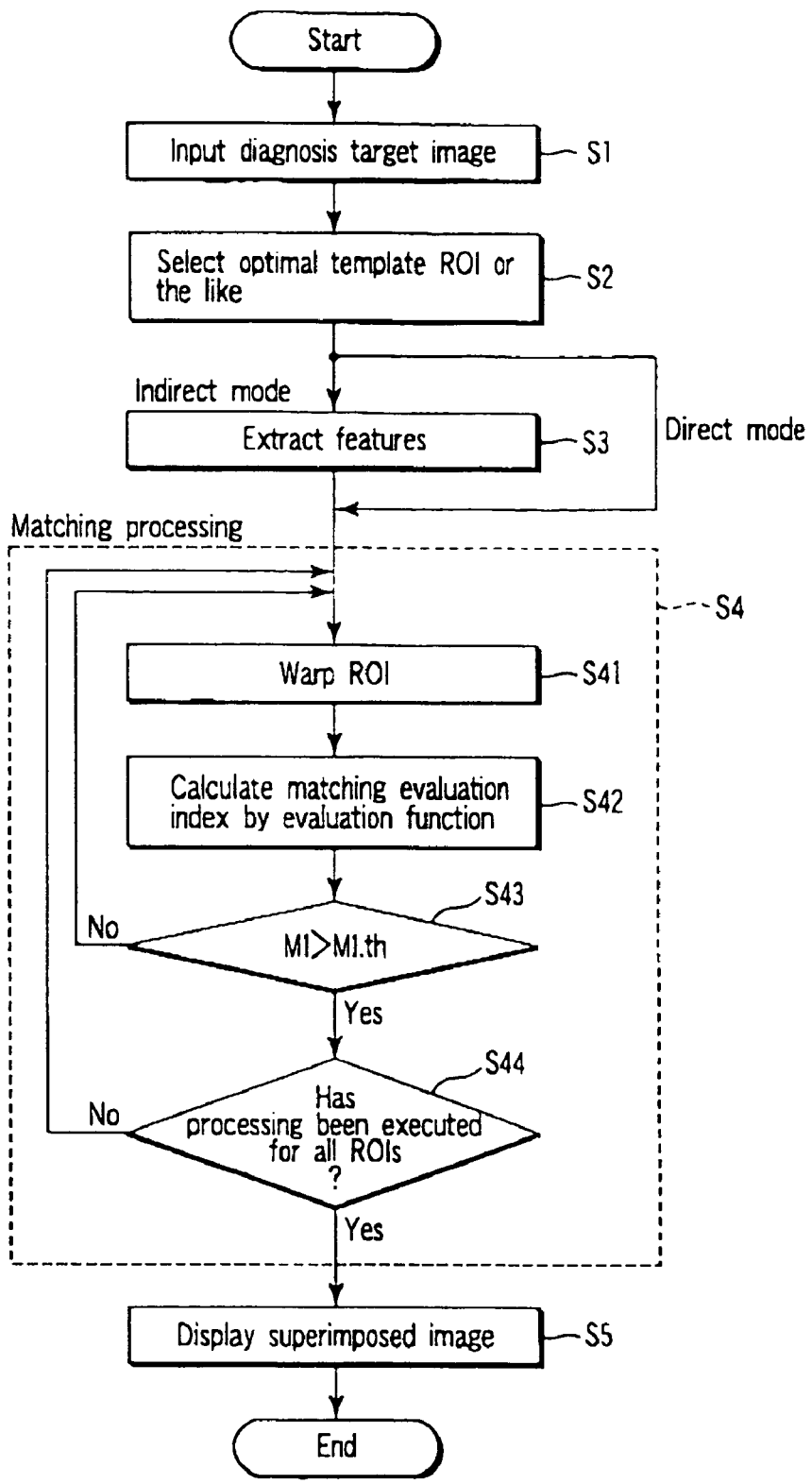
F I G. 3

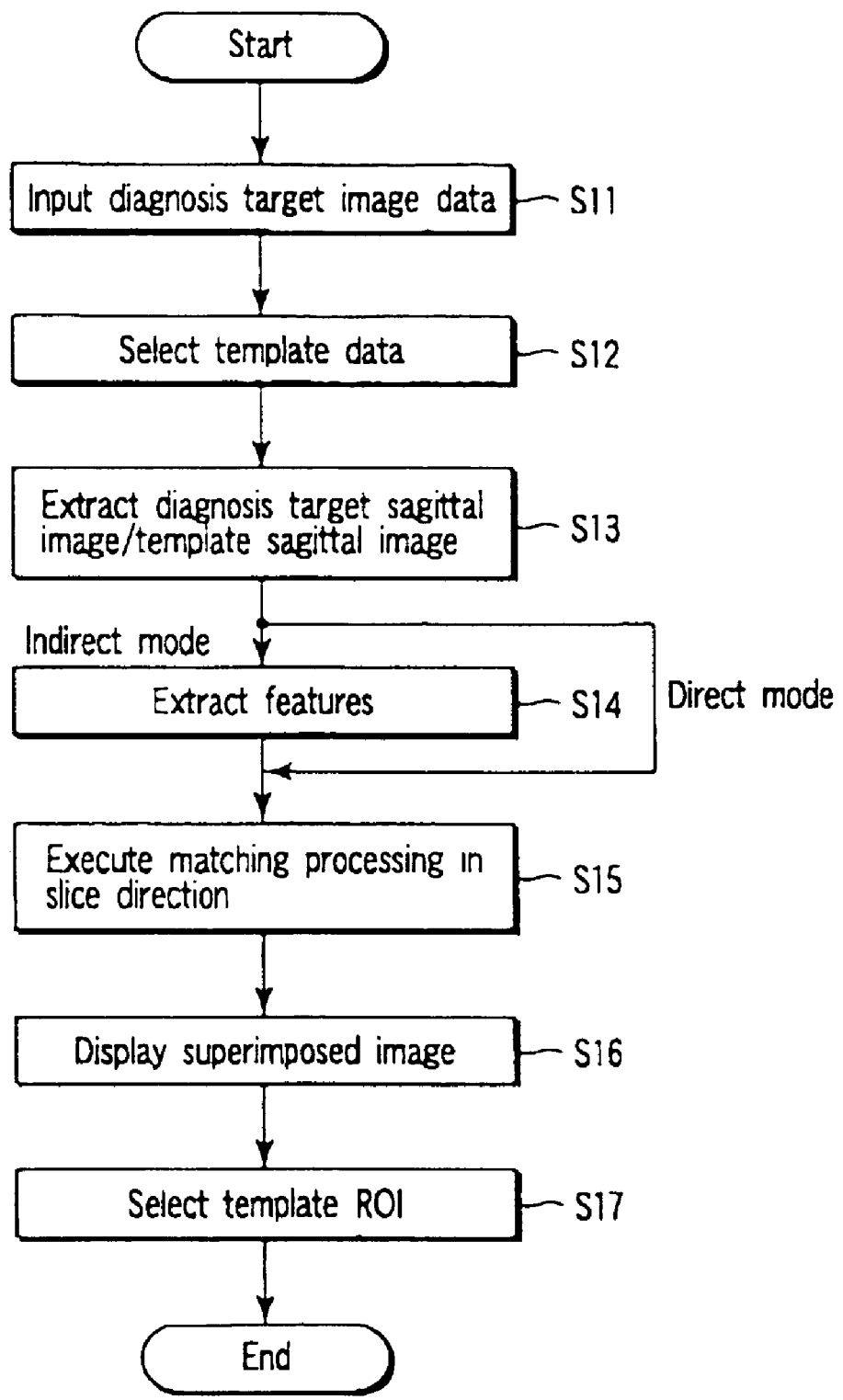
F I G. 6

MEDICAL IMAGE PROCESSING APPARATUS

CROSS-REFERENCE TO RELATED APPLICATIONS

This application is based upon and claims the benefit of priority from prior Japanese Patent Application No. 2005-118770, filed Apr. 15, 2005, the entire contents of which are incorporated herein by reference.

BACKGROUND OF THE INVENTION

1. Field of the Invention

The present invention relates to a technique used for matching between an image acquired by medical imaging equipment and an ROI (Region Of interest) set on the image.

2. Description of the Related Art

A medical image is generally obtained as mapping data having a value for each voxel obtained by dividing the image in the form of a lattice with a given size. If this mapping data is to be managed without any change, the amount of data to be managed becomes enormous, resulting in difficulty in making data correspond to clinical diagnoses. In general, therefore, some kind of information compression technique is used to store data as disease-specific databases and reduce the amount of data. As one of such methods, there is available a method of analyzing, or example, image data obtained by imaging a given organ or the like upon dividing (ROI division) the data into anatomically, physiologically significant spatial areas. Currently, for example, ROI division applied to an artery dominant region of a cerebral blood flow has been reported.

There are many needs and applications for such ROI division in the overall field of medical images, including diagnoses using SPECT and PET.

For example, strokes have recently become the third cause of death, following malignant tumors and cardiovascular diseases. Of the strokes, cerebral infarction occupies 60% of them and keeps increasing. In stroke diagnosis, the arteries of the cerebral blood vessels symmetrically include six main blood vessels, and dominant regions are determined by brain tissue, each of which can be three-dimensionally divided. When blood flows in these blood vessels are to be analyzed, a doctor divides an image of each patient which is represented by data acquired in the time-axis direction by setting a template ROI on each image (image division by ROI setting), and diagnosis information such as a time intensity curve (TIC) is generated for each ROI. In this case, a template ROI is set on an image to divide the area on the image into significant areas in anatomical terms, physiological terms, or other scientific terms. In general, medically standardized images are used. Conventionally, diagnosis target images having differences are warped into anatomically standardized images, and standard template ROIs defined in advance are then applied to the images (e.g., see Friston K J. Spatial registration and normalization of images. Human Brain Mapping. 2, 165-189, (1995), and Yoshitaka Uchida et al., "Statistical Image Diagnosis (3D SSP)", The Japanese Society of Technology Education, Vol. 58, No. 12, pp. 1563-1572 (2002) for anatomical standardization of images, and see Ryo Takeuchi, "Cerebral Nuclear Medicine Fully Automatic ROI Analysis Program: 3D SRT", The Japanese Society of Technology Education, Vol. 59, No. 12, pp. 1463-1474 (2003) for ROI setting).

In a conventional image division method based on ROI setting, however, the following problems arise.

First, a problem may be caused by an image warp error. That is, an image warp error may occur due to a warp algorithm for a diagnosis target image, the quality of target data, or the difference (individual difference) between standardized data and a diagnosis target image. This may cause artifacts. Conventional image warp techniques have achieved success to some extent in SPECT or PET. This is because, some limitations are imposed on the spatial resolution of original data, and image warp is executed upon decreasing the spatial resolution so as to reduce errors. For MRI and CT which originally have high spatial resolutions, higher accuracy is required than for SPECT and PET, and hence it is not always adequate to use a conventional technique based on image warp.

Second, an enormous processing cost may be required. That is, according to the conventional technique based on image warp, since a diagnosis target image acquired by imaging is used, spatially nonlinear warp processing is required. This nonlinear warp processing demands a high processing cost, and the cost may further increase depending on the number of data or the amount of data. For example, in the case of MRI, this processing must be applied to all data of several parameter types even for one examination unit, and hence this problem is especially serious.

Third, the image division technique is not suitable for applications which do not require morphological warp of diagnosis target images. That is, the conventional technique based on image warp cannot be applied to applications which do not want to warp the shapes of diagnosis target images, e.g., surgical operation and radiation therapy applications. In addition, it is sometimes necessary to superimpose and display an original image and an ROI, instead of displaying only the numerical value of the ROI. If only warped data is stored, the data needs to be inversely warped. It is, however, technically difficult to perform such inverse warp because, for example, the spatial resolution has already been degraded. Alternatively, diagnosis target images may be separately stored to be referred to as needed. Such an arrangement, however, is not practical.

BRIEF SUMMARY OF THE INVENTION

The present invention has been made in consideration of the above situation, and has as its object to provide a medical image processing apparatus which can easily set an ROI for dividing an organ significantly in anatomical/functional terms while absorbing individual differences without performing warp processing for a diagnosis target image.

According to an aspect of the present invention, there is provided a medical image processing apparatus comprising a storage unit which stores at least one of template ROIs set on an image; an input unit which inputs a diagnosis target image; a matching processing unit which executes first matching processing of matching the template ROI with the diagnosis target image used for image diagnosis by warping the template ROI; and an output unit which outputs the warped template ROI and the diagnosis image in a predetermined form.

According to another aspect of the present invention, there is provided a medical image processing method comprising: first matching processing of matching a template ROI set on an image with a diagnosis target image used for image diagnosis by warping the template ROI; and outputting the warped template ROI and the diagnosis image in a predetermined form.

BRIEF DESCRIPTION OF THE SEVERAL VIEWS OF THE DRAWING

FIG. 3 is a flowchart showing the flow of each process executed in the operation of the medical image processing apparatus 10;

FIG. 6 is a flowchart showing the flow of each process executed in the operation of a medical image processing apparatus 10.

DETAILED DESCRIPTION OF THE INVENTION

Figure 1:
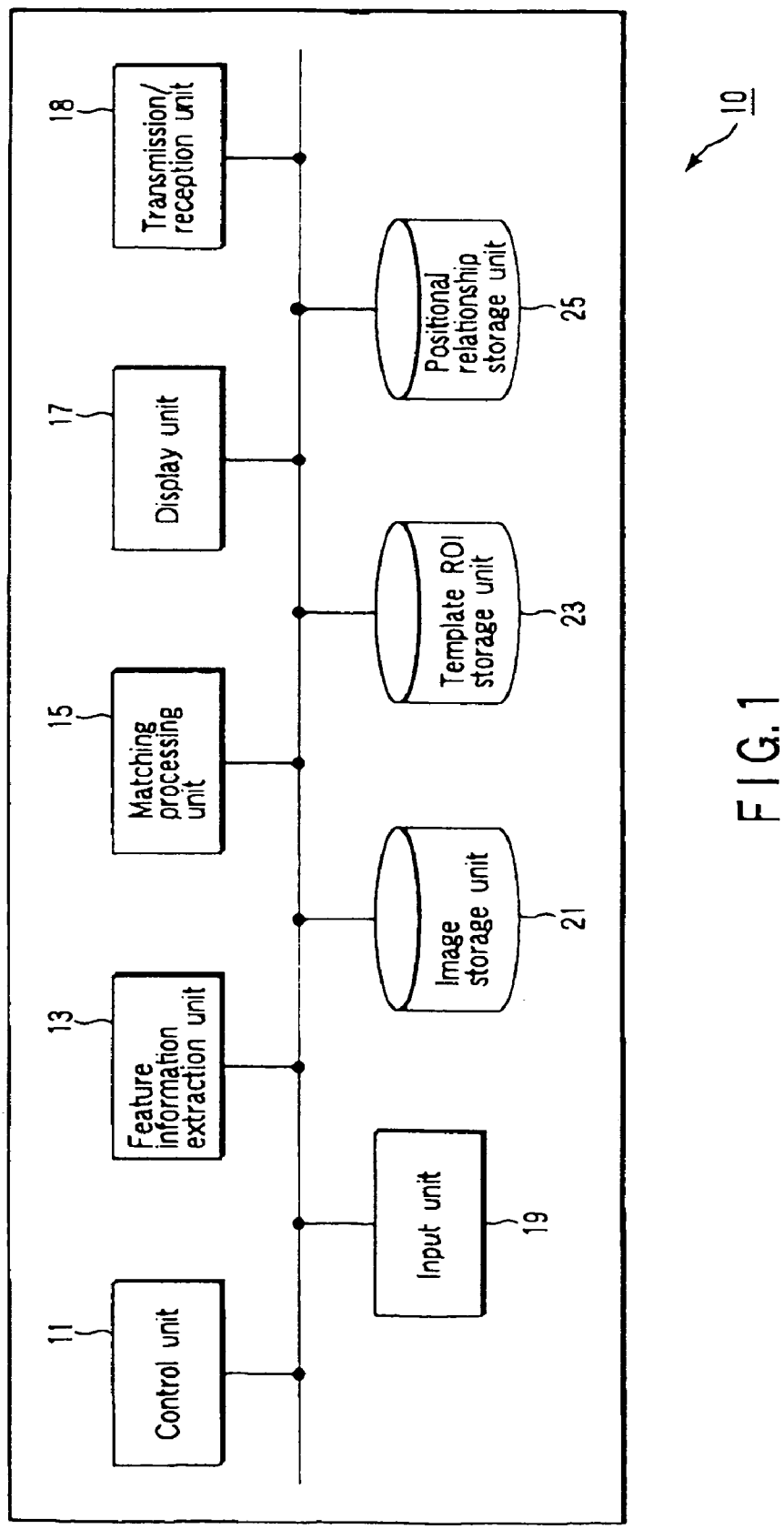
FIG. 1 is a block diagram showing the arrangement of a medical image processing apparatus 10 according to an embodiment.

The first to third embodiments of the present invention will be described below with reference to the views of the accompanying drawing. Note that the same reference numerals in the following description denote constituent elements having substantially the same functions and arrangements, and a repetitive description will be made only when required.

The first and second embodiments of the present invention will be described with reference to the views of the accompanying drawing. Note that the same reference numerals in the following description denote constituent elements having substantially the same functions and arrangements, and a repetitive description will be made only when required.

Note that a medical image processing apparatus according to the present invention is used as a standalone apparatus and can also be used while being incorporated in a medical workstation, medical image reference apparatus, medical imaging equipment, or the like. For a concrete description, the following embodiment will exemplify the medical image processing apparatus as a standalone apparatus.

First Embodiment

FIG. 1 is a block diagram showing the arrangement of a medical image processing apparatus 10 according to this embodiment. As shown in FIG. 1, the medical image processing apparatus 10 comprises a control unit 11, feature information extraction unit 13, matching processing unit 15, display unit 17, transmission/reception unit 18, input unit 19, image storage unit 21, template ROI storage unit 23, and positional relationship storage unit 25.

The control unit 11 performs overall control on the operation of the medical image processing apparatus 10. The control unit 11 performs control on an ROI warp matching function and the like (to be described later).

The feature information extraction unit 13 acquires feature information concerning various kinds of images such as a template ROI, standardized image, and diagnosis target image. In this case, for example, the following are diagnosis target images, standardized mage, and feature information concerning images.

Diagnosis target images are images which are acquired by various kinds of medical imaging equipment with various parameter settings and are used for diagnosis. More specifically, such images include a T1-enhanced image, T2-enhanced image, and diffusion-weighted image acquired by a magnetic resonance imaging (MRI) apparatus, a CT image acquired by an X-ray computed tomography (CT) apparatus, and the like.

Standardized images are images generally recognized (standardized) as images indicating human body structures and the like. More specifically, such images include the Talairach standard brain atlas (voxel size: 2.25 mm). In this atlas, the three-dimensional position of each region is defined in a coordinate system having the AC-PC line of the brain and a median sagittal section as a reference line and a reference surface, respectively.

Feature information concerning an image (to be simply referred to as "feature information" hereinafter) includes an attribute, index, numerical value, and the like which represent features concerning the image, and can be classified into image information, examination information, and patient information. Image information includes a video area (imaging region), landmark, area, image parameter type (e.g., a T1-enhanced image, T2-enhanced image, or diffusion-weighted image), physical quantity, and the like which can be specified on the image in terms of anatomy, structure, function (e.g., an optic area or a auditory area), data processing, or the like. For example, in the case of the head, as image information, the three-dimensional position, shape, volume (area), signal intensity, and the like of each of the following can be defined: the skin surface of the head, the contours of bones, the surface of the brain, the brain ventricle, blood vessels (arteries and veins), sulcus of the brain (Sylvian fissure and central sulcus), the falx cerebri, gray matter, and white matter. Examination information is information concerning the examination (image diagnosis), e.g., an examination purpose, a diagnosis region, the modality to be used, and series information. Patient information is information concerning the patient, e.g., the age, sex, and name (patient ID) of the patient. Some feature information has already added as image accessory information, and some feature information is acquired by executing predetermined image processing. For example, information of age, sex, image parameter, and the like is added as accessory information. Information of template ROI, the brain surface of a diagnosis image, and the like is acquired upon executing predetermined image processing.

The feature information extraction unit 13 performs analysis by using threshold processing, scaling processing, contour tracing, various kinds of filtering, and the like on the basis of a diagnosis region selected in advance or the like, thereby extracting feature information. Note that when matching processing to be described later is performed, identical pieces of feature information must be acquired from a template ROI and a diagnosis target image.

The matching processing unit 15 executes matching processing of warping a template ROI so as to match a diagnosis target image. This matching processing is executed by using, for example, a technique (direct mode) of comparing the pixel values (or voxel values) themselves of the template ROI and diagnosis target image with each other, a technique (indirect mode) using feature information concerning the diagnosis target image, or a technique based on a combination of the direct mode and the indirect mode. The contents of this matching processing will be described in detail later.

The display unit 17 displays diagnosis target images acquired by various kinds of medical imaging equipment, standardized images, and template ROIs in a predetermined form. The display unit 17 also displays a diagnosis target image and a template ROI in a superimposition form.

The transmission/reception unit 18 receives images acquired by various kinds of medical imaging equipment through a network. The transmission/reception unit 18 transmits a template ROI obtained (warped) by matching processing (to be described later) to another apparatus, as needed.

The input unit 19 comprises input devices such as a liquid crystal operation panel, a keyboard, a trackball, a mouse, and a dedicated I/F for implementing an ROI warp matching function (to be described later).

The image storage unit 21 stores image data such as diagnosis target image data and standardized image data, and also manages the image data in accordance with patient IDs and image IDs attached to the respective images.

The template ROI storage unit 23 stores template ROIs generated in advance and template ROIs warped by matching processing, as needed. Note that a template ROI is, for example, generated in advance by using a standardized image corresponding to each kind of image (e.g., for each kind of parameter acquired for medical imaging equipment, such as a T1-enhanced image acquired by an MRI apparatus). Each template ROI is stored as general volume data. In matching processing at a two-dimensional slice, such data is extracted as a necessary template slice on the basis of predetermined information. If a diagnosis target image is a multi-slice image, matching processing may be performed without changing the volume (three-dimensional) data.

The template ROI storage unit 23 stores feature information concerning each template ROI (or the volume data of each template ROI). The form of forming feature information is not limited in particular. For example, feature information may be stored as accessory information of each template ROI, or may be stored as an independent file managed in correspondence with each template ROI.

The positional relationship storage unit 25 stores the positional relationship between images which is obtained by analyzing the feature information of a template ROI and the feature information of a diagnosis target image which are acquired by matching processing. For example, a concrete example of the positional relationship is the positional relationship between a center of gravity and contour boundary as ROI coordinates on a standard brain atlas, the volume (area) of an ROI, statistics values of image values (a histogram, average value, SD, and skew (the degree of asymmetry)), and landmark of structures defined as feature information. This positional relationship can be defined on a two-dimensional section parallel to the AC-PC line which is an imaging section, which is often used for the brain, as well as being defined by three-dimensional data alone. Alternatively, every time an arbitrary section is designated, a positional relationship may be calculated. Note that positional relationships are managed in accordance with patient IDs and image IDs.

(Operation Based on ROI Warp Matching Function)

The operation of the medical image processing apparatus 10 which is implemented by the ROI warp matching function will be described next. This ROI warp matching function is designed to warp a template ROI in correspondence with each diagnosis target image on the basis of feature information and perform matching with the diagnosis target image by using the template ROI.

Figure 2:
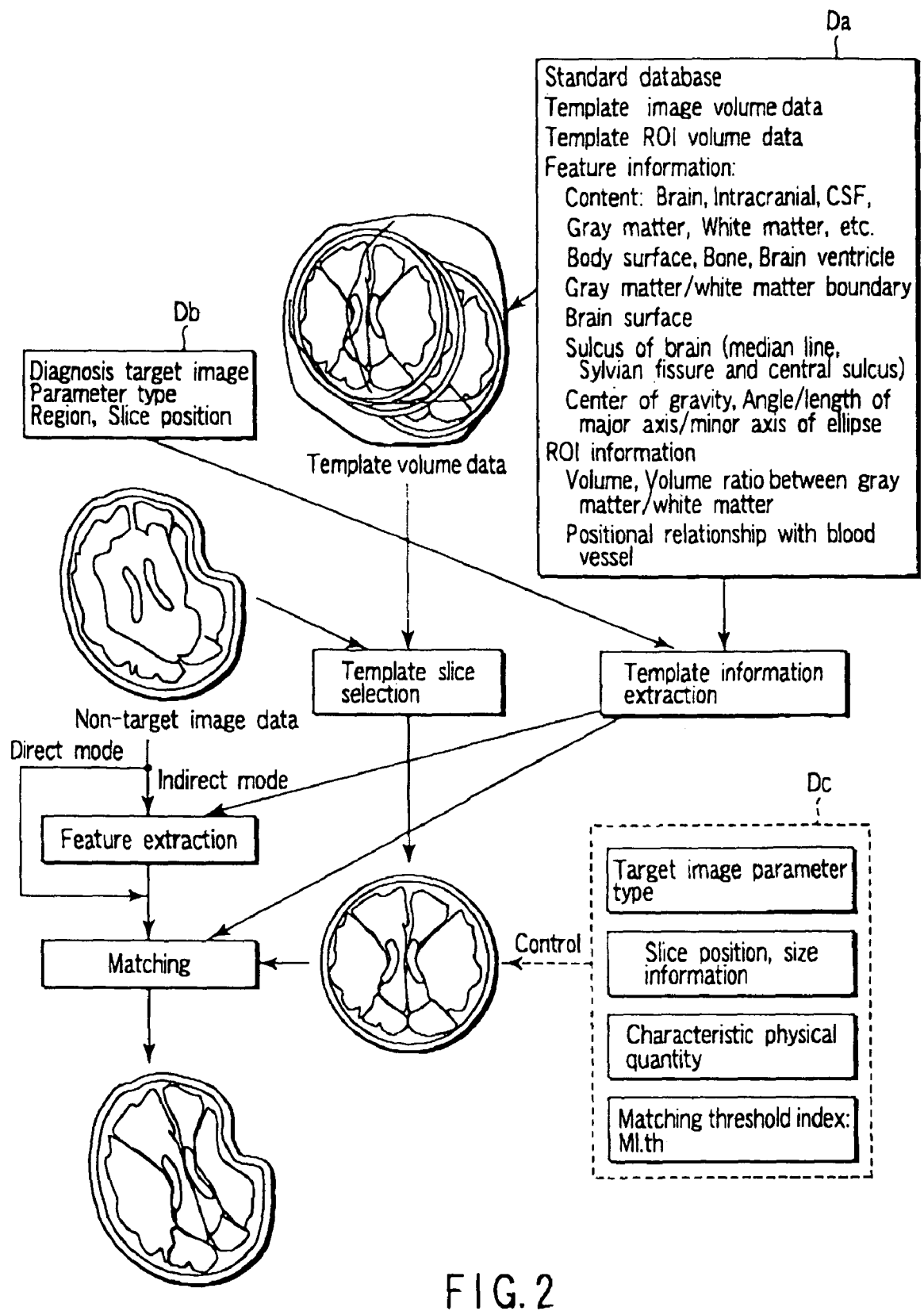
FIG. 2 is a conceptual view for explaining an ROI warp matching function which the medical image processing apparatus 10 comprises.

FIG. 2 is a conceptual view for explaining this ROI warp matching function. When a diagnosis image is input, feature information Db of the diagnosis target image is acquired as shown in FIG. 2. The feature information Db of this diagnosis target image is compared with feature information Da of each template ROI stored in advance to select a template ROI determined as an optimal template ROI (e.g., a template ROI having the maximum number of pertinent items). The selected template ROI is warped on the basis of a predetermined reference, and matching for making the template ROI correspond to the diagnosis target image is executed. As reference data for this warp processing, the pixel values of the selected template ROI and diagnosis target image, and pieces of predetermined feature information Dc (image parameter types, slice positions, size information, characteristic physical quantities, matching thresholds, and the like) of the selected template ROI and diagnosis target image are used.

Note that ROI warp by this function is performed either in the form of a three-dimensional space including a slice axis direction (a direction orthogonal to a corresponding slice surface) or in the form of a two-dimensional plane within a slice image. This embodiment can be applied to either form of ROI warp.

FIG. 3 is a flowchart showing the flow of each process executed in the operation of the medical image processing apparatus 10. As shown in FIG. 3, first of all, when a diagnosis target image and feature information concerning the diagnosis target image (e.g., the age and sex of the patient, a diagnosis region, an examination purpose, and a parameter type such as a T1-enhanced image) are input through the transmission/reception unit 18, the control unit 11 selects, for example, a template ROI having the maximum number of items pertinent to the input feature information, together with other pieces of necessary information, and reads out them from the template ROI storage unit 23 (steps S1 and 52).

Note that if neither template ROI to be selected nor necessary information exists in the image storage unit 21, the control unit 11 newly generates each piece of information and the like. In this generation process; if the diagnosis target image is two-dimensional image data, a template ROI as a standard needs to be sliced at the same surface as a defined slice surface. If the database is three-dimensional image data (volume data), an image on which two-dimensional ROIs cut at the same slice surface is used as a template ROI. In this case, the standard brain on which the template ROI is placed and the diagnosis target image can be warped not only within the slice surface but also in a direction (slice axis direction) orthogonal to the slice surface. Warp processing in the slice axis direction will be described in the second embodiment.

When matching processing is performed between two-dimensional image data, a warp error in the slice axis direction may occur. For this reason, matching processing between three-dimensional image data is preferable processing. If, however, a limitation is imposed on the number of images in the slice axis direction in consideration of restrictions on data acquisition, matching processing between two-dimensional image data is used. In this matching processing between two-dimensional image data, errors in the slice axis direction must be tolerated. In performing ROI division, if an ROI is relatively large, a slight warp difference poses no serious problem in practice.

In addition, in matching processing between two-dimensional image data, it is preferable to avoid the use of a structure exhibiting large variations in the slice axis direction as an extraction target. As landmarks in a blood flow dominant area ROI, a brain surface, brain ventricle, median line, and the like can be satisfactorily set in either of the case of two-dimensional image data and the case of three-dimensional image data. It can therefore be thought that no very large individual differences occur even in the slice axis direction.

The number of template ROIs to be selected need not be one and may be two or more. Alternatively, this embodiment may have an arrangement in which template ROIs having preferred conditions following a template ROI may be narrowed down to template ROI candidates, and the user executes final selection. With this arrangement, selecting, for example, template ROIs adjacent in the slice axis direction as candidate templates makes it possible to perform fine adjustment concerning template ROI selection in the slice axis direction.

When matching processing is to be performed in the direct mode, the flow shifts to step S4. When matching processing is to be performed in the indirect mode, feature information including a landmark (especially, a portion which is also defined on a standardized three-dimensional image in the standard database) on a diagnosis target image is extracted (step S3). The feature information extracted in this manner is set as a landmark for subsequent matching processing. The feature information extraction unit 13 extracts such feature information by executing processing such as threshold processing, scaling processing, contour tracing, and various kinds of filtering.

The following two points are especially important in feature information extraction in the case of the brain. First, it is important to extract an axis and a surface as references for the definition of a coordinate or gin and axes. In MRI, the AC-PC line as a reference axis of a standard coordinate system can be relatively easily extracted by using a three-dimensional image with a certain voxel size (2 to 3 mm). In general, a two-dimensional axial image in MRI is planned in advance and obtained at a parallel section. If the AC-PC line can be identified, a sagittal tomogram which passes through the middle point of the AC-PC line and is orthogonal to it can be acquired. Alternatively, as more easily performed in three-dimensional SSP (three-dimensional Stereotactic Surface Projections), a sagittal tomogram may be approximated and identified by a three-dimensional image, and the AC-PC line may be approximated by a straight line and identified by extracting, as landmarks, the polus frontalis, the lower end of the front portion of the corpus callosum, the hypothalamus, and the polus occipitalis, or the AC-PC line may be identified with the four landmarks after a two-dimensional sagittal tomogram is directly acquired.

Second, it is important to extract a brain surface to determine the overall size. In a T2-enhanced image obtained by MRI, the boundary between a CSF (Cerebral Spinal Flow) and a brain surface is clear, and hence the brain surface can be extracted by a search based on a threshold and a connected region. In a blood flow image, since a bone and CSF are represented by silence signals, a brain surface directly becomes an outside boundary. In general, since the purpose of this operation is to perform matching with an ROI having a large size relative to an image voxel size, there is no need to strictly define a boundary. It suffices to approximate a boundary with a smooth spline function or the like. Of blood vessels, an artery can be obtained by three-dimensional TOF (Time Of Fright)-MRA, and hence a boundary and central line are simultaneously extracted. Since the purpose of this operation is also to perform matching, capillary blood vessels need not undergo extraction. It suffice to perform extraction up to the second branch of a chief artery by three-dimensional TOF-MRA. Blood vessels are especially important in ROI matching for each ROI in a brain deep portion inside the brain or each dominant region of a blood flow image.

Subsequently, based on the extracted feature information, the landmarks in particular, matching processing is executed to optimally warp the template ROI selected in step S2 (step S4). Note that this matching processing is executed by the matching processing unit 15 on the basis of the parameter type of a diagnosis target image, a slice position, size information, and a matching index (MI) (to be described later). In the strict sense, this matching processing differs in contents in a case wherein a template ROI is binarized image data (e.g., image data representing only a shape) and a case wherein a template ROI is image data of a corresponding parameter type or an image defined by using a parameter average value in the template ROI. In the following description, the contents of matching processing are common to any kind of image data as template ROIs.

First of all, ROi warp processing is executed (step S41). This ROI warp processing includes a process of handling ROIs as a cluster in which they are connected to each other and a process of individually performing processing within each ROI.

In each process, first of all, rough translation is performed by affine transformation as linear transformation. Affine transformation includes reference axis translation, size transformation (scaling in the three axis directions), and shear. In this affine transformation, rough adjustment is analytically performed, and fine adjustment is performed in a trial and error manner. After linear transformation, local distortion is transformed by nonlinear transformation. In nonlinear transformation, an image is divided into a plurality of local areas, and linear transformation is performed for each area. Since the boundaries between areas for which different types of linear transformation are performed shift from each other, additional processing is performed to smoothly connect the boundaries. Alternatively, another nonlinear warping method may use a phenomenon in which when a "spring" is mathematically defined on the periphery of an ROI to translate the periphery, internal ROIs automatically curve following the translation. In the latter method, even if nonlinear warp is required, even translation of the outer contour of a brain surface makes it possible to translate the shapes of internal ROIs to some extent following the translation of the outer contour. In addition, if necessary, this processing can be performed in combination with fine adjustment by the former nonlinear transformation.

Figure 4A:
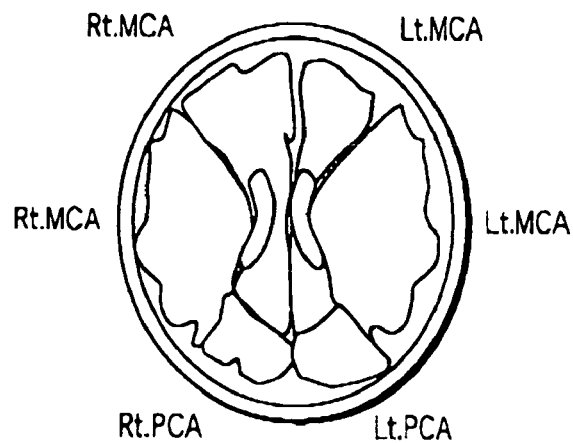
FIGS. 4A to 4F are views for explaining ROI warp processing.
Figure 4B:
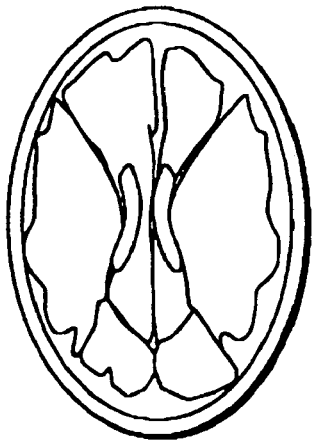
Figure 4C:
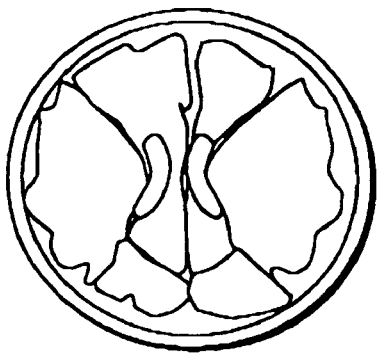
Figure 4D:
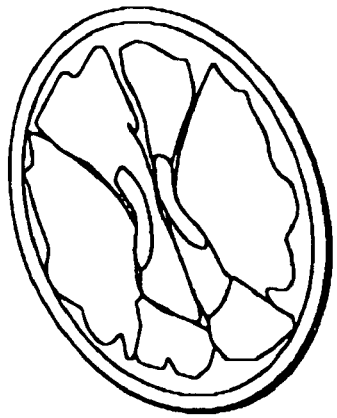
Figure 4E:
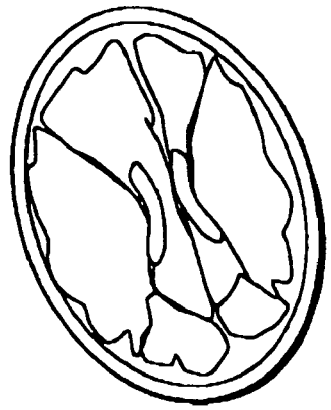
Figure 4F:
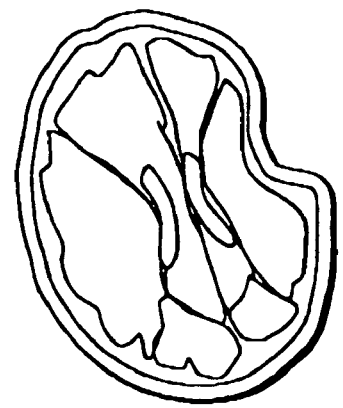

FIGS. 4A to 4F are views for explaining ROI warp processing. FIGS. 4B and 4C show images obtained by linear transformation (scaling) in the x/y direction for the standardized template ROI before warp in FIG. 4A. FIG. 4D shows an image obtained by performing linear transformation (scaling) and rotation in the x/y direction for the standardized template ROI. FIG. 4E shows an image obtained by performing hemispherical linear transformation for the standardized template ROI. FIG. 4F shows an image obtained by performing nonlinear transformation for the standardized template ROI.

An MI value as a matching evaluation index is calculated by a predetermined evaluation function, and the optimality of matching processing is determined on the basis of the MI value (steps S42 and S43). More specifically, the magnitude of an index MI representing a matching degree is sequentially compared with a predetermined limit value (Matching Threshold Index: MTI) to determine which is larger, and ROI warp processing is repeatedly executed until the magnitude of an MI exceeds the magnitude of an MTI.

Note that one of various kinds of values can be selected as an MI. They include, for example, the ratio or difference between the statistic values of image values within each ROI and a reference image and a least squares error in the case of a histogram. When an MI is to be calculated, since this value is a relative value in the case of an MRI image, the value is compared with an image value of a standardized image upon being normalized by calculating the ratio between itself and an identical reference region, thereby performing determination.

In another matching method, when an average value inside each template ROI of the same parameter type is defined in a standard database in setting a template ROI with respect to a parameter image as a target such as a blood flow dominant area, spatial image value distributions have similarity. For this reason, an average value map in each template ROI is generated in advance by using standard data. That is, an image is generated in advance, which is embedded as a uniform image value in a template ROI. An average value map in each ROI of a target image is generated every time warping is performed, thereby mutually determining MIs. In addition, matching may be performed by using a mutual information amount (MI), which are currently used often, as an index for matching between images with different contrasts. When the direct mode of warping all pixels is ended, an ROI is automatically warped. In the indirect mode in which mapping is performed with reference to landmarks, if matching is performed between the landmarks, ROIs are warped by interpolation. In the indirect mode, therefore, interpolation processing performed more than in the direct mode.

It is determined whether matching processing has been executed for all the template ROIs selected in step S2 (step S44). If matching processing has been executed for all the template ROIs, a superimposed image of the diagnosis target image and ROIs after template ROI warp is displayed (step S5). In addition, if there are template ROIs for which matching processing has not been executed, matching processing is executed for them, and a superimposed image of the diagnosis target image and ROIs after template ROI warp is displayed.

According to the above arrangement, the following effects can be obtained.

According to this medical image processing apparatus, since no warp is performed with respect to diagnosis target mages exhibiting large individual differences, no error occurs in the diagnosis target images themselves. On the other hand, since a template ROI is warped, even if an ROI warp or setting error occurs, a slight error (not in the diagnosis target image) occurs from anatomical/physiological division in the template ROI as a slight change in the numerical value (mean value, standard deviation or the like) of a statistics value analyzed within the template ROI. Therefore, this error hardly becomes an essential error.

In addition, this medical image processing apparatus is designed to warp template ROIs, warp processing is limited to patterns corresponding to the template ROIs. Therefore, no warp is required for portions other than ROIs, the calculation cost can be reduced as compared with the case wherein diagnosis target images exhibiting large individual differences are warped pixel by pixel. If a plurality of diagnosis images exist, in particular, warp processing need not be performed for each diagnosis image. This provides a high practical benefit in terms of calculation cost reduction. There are various kinds of data as diagnosis target images. On the other hand, landmarks used for matching between template ROIs are binary data in many cases. This makes it possible to simplify calculation processing and reduce the operation load on the apparatus as compared with the prior art. In addition, the overall throughput of template ROI setting can be improved. Note that when the direct mode of performing matching between pixel values of images is to be used, unnecessary processing can be omitted in extraction processing. However, it takes much time for matching between pixels.

In addition, since this medical image processing apparatus is designed to warp template ROIs, the apparatus can be applied to even mages with different parameters as long as they are sensed at the same position. The work load on the operator can therefore be reduced.

Furthermore, this medical image apparatus can simplify warp processing as compared with the prior art, and hence can be easily made compatible with another apparatus or system. Recently, in particular, a reliable evidence is required from a blood flow in the case of a cerebral infarction or neurological disease. Applying this medical image processing apparatus to CAD (Computer Aided Diagnosis) can contribute to highly reliable medical services.

Second Embodiment

In the first embodiment, if diagnosis target image data is three-dimensional data which is small in slice thickness to some extent (5 mm or less) and covers the entire brain or organ, matching can be performed with high accuracy even in the slice axis direction when matching is performed up to three-dimensional matching. This makes it possible for the first embodiment to satisfactorily make diagnosis image data coincide with a template ROI.

If, however, diagnosis target image data is two-dimensional mage data limited to the slice axis direction, planning is made in advance to set a slice position at a desired position in imaging operation. However, diagnosis target image data and template ROI data may shift from each other in the slice axis direction. In this case, the "slice axis direction" is a direction orthogonal to a diagnosis target image and a corresponding template ROI as described in the first embodiment and parallel to the body axis direction. More specifically, if a diagnosis target image is an axial section, the slice axis direction corresponds to a coronal section or/and a sagittal section. In this case, the cephalocaudal (HF) direction, right and left (RL) direction, and back and forth direction are respectively defined as the Z direction, X direction, and Y direction in accordance with customary practice. In this case, diagnosis target image data and template ROI data need to be matched with an allowable range or less. If only part of an organ is covered by a two-dimensional single slice or multi-slice, it is difficult to perform three-dimensional matching.

The second embodiment will exemplify a medical image processing apparatus which performs matching processing in the slice axis direction. This matching processing in the slice axis direction is executed as, for example, independent processing or preprocessing for matching processing between a diagnosis target image and a template ROI according to the first embodiment.

Note that in matching processing according to this embodiment, a tomogram or projection image parallel to the slice axis direction is used as a reference image. Such a reference image is acquired as a coronal or sagittal section if a diagnosis target image is an axial section in MRI, or as a projection image such as a scanogram (positioning image) in CT. These images are used mostly to plan a section to be imaged next. Therefore, there is no need to acquire again a reference image to be used in this matching processing.

Figure 5:
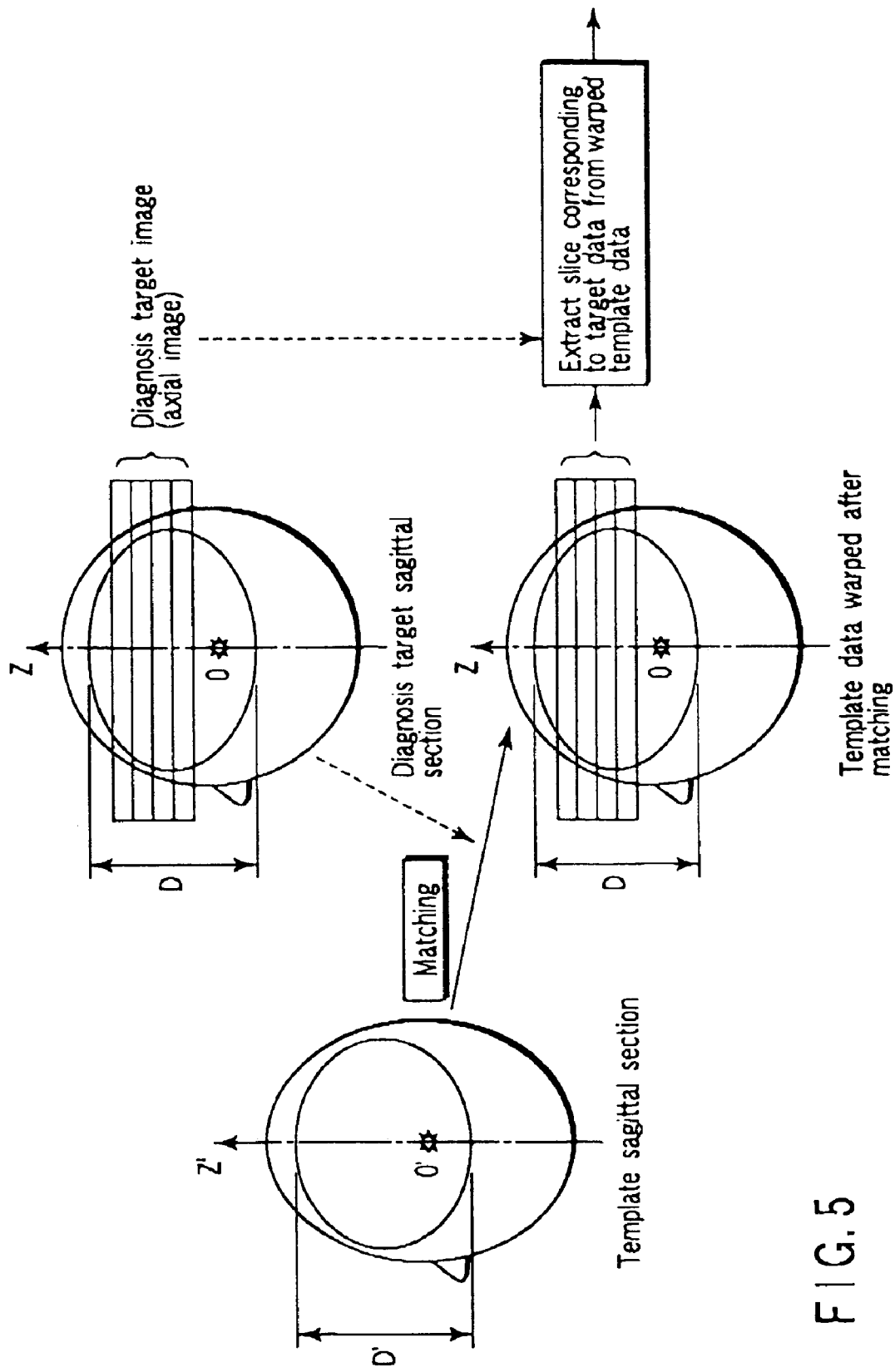
FIG. 5 is a view for explaining the concept of matching processing according to the second embodiment.

FIG. 5 is a view for explaining the concept of matching processing according to this embodiment. As shown in FIG. 5, when a diagnosis target image is an axial section, a diagnosis target sagittal section (median plane) imaged at the center in the X (RL) direction of a diagnosis target (e.g., the brain) is used for planning. In addition, a template sagittal section orthogonal to the diagnosis target image (axial section) is extracted from the template data. After matching processing between the extracted template sagittal section and the diagnosis target sagittal section, a template ROI corresponding to the diagnosis target image is extracted. That is, since the position of the diagnosis target image on the sagittal image in the slice axis direction (HF direction) is known, two-dimensional matching between the sagittal images of the diagnosis target image data and template data makes it possible to extract a template ROI corresponding to the diagnosis target image on the template data.

If the section positions of the two data in the slice axis direction almost coincide with each other, there is no need to warp the overall template data, and it suffices to extract a corresponding slice by obtaining the relationship between the template data and the diagnosis target image data in the slice axis direction. As a matching method in the slice axis direction, although a method of performing nonlinear transformation upon mutually extracting the size of the brain in the slice axis direction may be used, a method of performing matching by linear transformation can be satisfactorily used. In the case of linear transformation, letting Z' and Z be the slice axis directions of template data and target data, and D' and D be the sizes of the brain, conversion is performed according to $Z'=(D'/D)*Z$ upon matching origins O' and O in the slice axis directions Z' and Z. Thereafter, a slice at the same position Z of the template data may be extracted from the position (position Z) of each slice of the target data in the slice axis direction.

The operation of the medical image processing apparatus according to this embodiment will be described next.

FIG. 6 is a flowchart showing the flow of each process executed in the operation of the medical image processing apparatus 10. For a concrete description, assume that a diagnosis target image is an axial image associated with the brain.

As shown in FIG. 6, first of all, when a diagnosis target image and feature information concerning the diagnosis target image (e.g., the age and sex of the patient, a diagnosis region, an examination purpose, and a parameter type such as a T1-enhanced image) are input through a transmission/reception unit 18, a control unit 11 selects, for example, a template ROI having the maximum number of items pertinent to the input feature information, together with other pieces of necessary information, and reads out them from a template ROI storage unit 23 (steps S11 and S12).

The control unit 11 extracts a diagnosis target sagittal image parallel to the slice axis direction from the diagnosis target image data, and also extracts a template sagittal image parallel to the slice axis direction from the template data (step S13).

When matching processing in the direct mode is to be performed between the template sagittal image and the diagnosis target sagittal image, the flow shifts to step S15. If matching processing in the indirect mode is to be performed, features including landmarks (portions defined on a standardized three-dimensional image in the standard database) are extracted on the diagnosis target sagittal image (step S14).

Subsequently, matching processing is executed on the basis of the landmarks, in particular, to make the scale of the template sagittal image extracted in step S14 coincide with that of the diagnosis target sagittal image in the slice axis direction (step S15). The template sagittal image after the matching processing is displayed upon being superimposed on the diagnosis target sagittal image as needed (step S16). A template ROI corresponding to the diagnosis target image is selected (step S17), and matching processing based on, for example, the technique described in the first embodiment is executed.

According to the above arrangement, positioning between diagnosis target image data and template ROI data in the slice axis direction can be performed by using images parallel to the slice axis direction. As a consequence, even if the diagnosis target image data and the template ROI data deviate from the template data in the slice axis direction due to a size difference or the like, the same effects as those of the first embodiment can be obtained.

The present invention is not limited to the above embodiments, and constituent elements can be modified and embodied in the execution stage within the spirit and scope of the invention. For example, the following are concrete modifications of the embodiments.

(1) Each function described in each embodiment can also be realized by installing programs corresponding to the respective processes in a computer and unarchiving them in a memory. In this case, the programs which can cause the computer to execute the corresponding techniques can be distributed by being stored in recording media such as magnetic disks (floppy disks, hard disks, and the like), optical disks (CD-ROMs, DVDs, and the like), and semiconductor memories.

(2) In each embodiment described above, the template ROI volume data used in matching processing may be selected stepwise. Assume that feature information "30's male, brain diagnosis, T1-enhanced image" is added, and that a plurality of template ROI volume data having this feature information are present. In this case, the matching processing unit 15 reads out all the plurality of corresponding template ROI volume data and presents them to the user through a predetermined window. The user may select desired data based on visual confirmation of other feature information and ROI volume data itself of the plurality of presented template ROI volume data.

(3) In each embodiment described above, for example, an optimal template ROI may be selected stepwise from the template ROI volume data. More specifically, predetermined feature information (e.g., a bone contour, brain surface, or normalized physical amount) of a diagnosis image is acquired, a plurality of template ROIs having the same value as or similar value to that of the predetermined feature information are presented to the user through a predetermined window. The user may select desired data by examining each presented template ROI itself or the feature information of each data.

(4) Each embodiment described above has exemplified a case in that the corresponding template ROI is selected based on the feature information from the template ROI volume data. However, the present invention is not limited to this. The corresponding template ROI may be selected based on the feature information of a plurality of template ROIs serving as two-dimensional images, and ROI warp matching processing described above may be performed. In this case, one of the axial, sagittal, and coronal image template ROIs is prepared depending on an application purpose.

The present invention is not limited to the above embodiments, and constituent elements can be modified and embodied in the execution stage within the spirit and scope of the invention. In addition, various inventions can be formed by proper combinations of a plurality of constituent elements disclosed in the above embodiments. For example, several constituent elements may be omitted from all the constituent elements disclosed in the above embodiments. Furthermore, constituent elements in the different embodiments may be properly combined.

What is claimed is:
1. A medical image processing apparatus comprising:
 a storage unit which stores at least one of template ROIs set on an image;
  an input unit which inputs a diagnosis target image;
  a matching processing unit which executes first matching processing of matching the template ROI with the diagnosis target image used for image diagnosis by warping the template ROI; and
  an output unit which displays the warped template ROI and the diagnosis image in a superimposed form;
  wherein the matching processing unit performs the first matching processing with reference to a pixel value of the template ROI and a pixel value of the diagnosis image.

2. An apparatus according to claim 1, which further comprises an extraction unit which extract feature information of the diagnosis target image, and in which
the matching processing unit performs the first matching processing by warping the template ROI on the basis of the feature information.

3. An apparatus according to claim 2, wherein when there are a plurality of template ROIs, the matching processing unit selects at least one of the template ROIs on the basis of the feature information, and executes the first matching processing to the selected template ROI.

4. An apparatus according to claim 1, wherein when there are plurality of template ROIs, the matching processing unit executes the first matching processing to each of said plurality of template ROIs.

5. An apparatus according to claim 1, wherein the feature information includes at least one of an imaging region, a landmark and a physical quantity which can be specified in the image in at least one of anatomical terms, structural terms, functional terms, and data processing terms.

6. An apparatus according to claim 1, the feature information includes at least one of an examination purpose, a diagnosis region, the modality to be used, and series information.

7. An apparatus according to claim 1, wherein the output unit superimposes and displays the warped template ROI and the diagnosis image.

8. An apparatus according to claim 7, wherein the matching unit extracts a first image parallel to the predetermined direction from the first data, extracts a second image parallel to the predetermined direction from the second data, and executes the second matching processing on the basis of the first image and the second image.

9. An apparatus according to claim 1, wherein
the storage unit stores first data including at least a plurality of standard templates each of which is substantially orthogonal to a predetermined direction,
the input unit inputs second data including a plurality of diagnosis target images each of which is substantially orthogonal to the predetermined direction, and
the matching unit executes second matching processing of making the second data correspond to the first data in the predetermined direction by warping the second data, selects a template ROI corresponding to the diagnosis target image from the first data on the basis of information concerning the diagnosis target image after execution of the second matching processing, and executes the first matching processing by using the selected template ROI.

10. A computer implemented medical image processing method comprising:
at least one computer including a processer for performing the following:
first matching processing of matching a template ROI set on an image with a diagnosis target image used for image diagnosis by warping the template ROI; and
outputting the warped template ROI and the diagnosis image in a superimposed form;
wherein the outputting includes superimposing and displaying the warped template ROI and the diagnosis image.

11. A method according to claim 10, which further comprises an extracting feature information of the diagnosis target image, and in which
the first matching processing is performed by warping the template ROI on the basis of the feature information.

12. A method according to claim 11, further comprising:
when there are a plurality of template ROIs, selecting at least one of the template ROIs on the basis of the feature information, and executing the first matching processing to the selected template ROI.

13. A method according to claim 10, wherein the first matching processing is performed with reference to a pixel value of the template ROI and a pixel value of the diagnosis image.

14. A method according to claim 10, wherein when there are plurality of template ROIs, the first matching processing is performed to each of said plurality of template ROIs.

15. A method according to claim 10, wherein the feature information includes at least one of an imaging region, a landmark and a physical quantity which can be specified in the image in at least one of anatomical terms, structural terms, functional terms, and data processing terms.

16. A method according to claim 10, the feature information includes at least one of an examination purpose, a diagnosis region, the modality to be used, and series information.

17. A method according to claim 10, further comprising:
second matching processing of making a first data correspond to a second data in the predetermined direction by warping the first data, first data including at least a plurality of standard templates each of which is substantially orthogonal to a predetermined direction and the second data including a plurality of diagnosis target images each of which is substantially orthogonal to the predetermined direction; and
selecting a template ROI corresponding to the diagnosis target image from the first data on the basis of information concerning the diagnosis target image after execution of the second matching processing; and
in which the first matching processing is performed by using the selected template ROI.

18. A method according to claim 17, wherein the matching unit extracts a first image parallel to the predetermined direction from the first data, extracts a second image parallel to the predetermined direction from the second data, and executes the second matching processing on the basis of the first image and the second image.

* * * * *